(12) United States Patent
Mueller et al.

(10) Patent No.: US 6,704,946 B1
(45) Date of Patent: Mar. 16, 2004

(54) SPRAYER ASSEMBLY

(75) Inventors: John R. Mueller, Wauwatosa, WI (US); Patricia M. Mueller, Wauwatosa, WI (US); Henry M. Anderson, Jr., Belding, MI (US)

(73) Assignee: Idea Factory, Inc., Menomonee Falls, WI (US)

( * ) Notice: Subject to any disclaimer, the term of this patent is extended or adjusted under 35 U.S.C. 154(b) by 16 days.

(21) Appl. No.: 10/178,983

(22) Filed: Jun. 25, 2002

(51) Int. Cl.[7] .............................. A47K 3/20; A47K 4/00; E03D 9/08
(52) U.S. Cl. ..................... 4/420.4; 4/420.1; 239/447; 137/118.02
(58) Field of Search .............................. 4/420.1–420.4, 4/443, 447, 448; 239/442, 446, 447; 137/118.02, 118.05, 118.07, 872, 874, 878, 881

(56) References Cited

U.S. PATENT DOCUMENTS

| | | | |
|---|---|---|---|
| 3,568,667 A | * | 3/1971 | Krieger et al. .............. 601/165 |
| 3,667,683 A | * | 6/1972 | Gilbert ......................... 239/446 |
| 4,000,742 A | | 1/1977 | DiGicomo |
| 4,287,618 A | | 9/1981 | Silver |
| 4,510,630 A | | 4/1985 | Osgood |
| 4,596,058 A | | 6/1986 | Nourbakhsh |
| 4,807,311 A | | 2/1989 | Ingels |
| 5,023,961 A | | 6/1991 | Alonso |
| 5,141,016 A | * | 8/1992 | Nowicki ................. 137/118.07 |
| 5,263,205 A | | 11/1993 | Leunissen |
| 5,272,774 A | * | 12/1993 | Ivko et al. .................... 4/420.4 |
| 5,287,566 A | | 2/1994 | Azada |
| 5,384,919 A | | 1/1995 | Smith |
| 5,419,363 A | | 5/1995 | Robinson |
| 5,560,548 A | | 10/1996 | Mueller et al. |
| 5,685,028 A | | 11/1997 | Miller et al. |
| 5,720,055 A | | 2/1998 | Krist |
| 5,742,961 A | | 4/1998 | Casperson et al. |
| 5,937,451 A | | 8/1999 | Mihara |
| 5,953,766 A | | 9/1999 | Szoke |
| 5,991,937 A | | 11/1999 | Safara |

* cited by examiner

Primary Examiner—Tuan N. Nguyen
(74) Attorney, Agent, or Firm—Joseph S. Heino

(57) ABSTRACT

A sprayer assembly adapted for releasable attachment to a water supply line, such as for a conventional toilet, is provided. The sprayer includes a three-way valve housing connected to the water supply line for the toilet, the valve housing including a supply conduit and a diverting conduit. A plunger is slidably disposed within the diverting conduit and is biased to a closed position by a biasing means extending between the supply conduit and the plunger. An attachment member is releasably engageable with the diverting conduit and operates to slide the plunger with respect to the diverting conduit in order to allow fluid flow through both the supply conduit and the diverting conduit. The attachment member is secured to one end of a hose that is attached to a sprayer head opposite the attachment member that enables an individual to manually dispense water flowing from the valve housing and through the attachment member and hose to the sprayer head.

21 Claims, 3 Drawing Sheets

SPRAYER ASSEMBLY

FIELD OF THE INVENTION

The present invention relates to spraying devices and more specifically to a sprayer assembly including a three-way valve to which the sprayer can be selectively attached that allows water to flow through the valve to a toilet water tank or reservoir and to the sprayer simultaneously when the sprayer is attached to the valve.

BACKGROUND OF THE INVENTION

To maintain personal hygiene, individuals often utilize bidets after using a bathroom in which the bidet is located. On many occasions, bidets take the form of commode-shaped structures that are positioned immediately adjacent a conventional toilet in order to facilitate use of the bidet by an individual. However, bidets of this type are very costly and time consuming to install, and take up a substantial amount of space within the bathroom in which they are located.

Alternatives to these conventional types of bidets have been developed in which the bidet consists of a sprayer including a dispensing nozzle and a hose connected to a water supply line. The water supply line can be a water supply line separate from the supply line to the toilet, or can be the water supply line connected directly to the toilet tank or reservoir. In some of these alternative designs, the sprayer is fixedly attached to a structure of the toilet, i.e., the seat, in order to dispense a cleansing stream of water from a particular location, and in other alternative designs the sprayer is movable with respect to the toilet such that an individual can manually position the sprayer where necessary.

However, in all of these alternative designs, the bidet sprayer is fixedly attached to the water supply line, such that the sprayer must be positioned or retained within a housing, cradle or other supporting device located on or adjacent the toilet when the sprayer is not in use. The positioning of the sprayer on or near the toilet in this manner is not aesthetically pleasing. Further, this manner of positioning of the sprayer also creates a situation in which the sprayer can be inadvertently contacted and damaged or activated by a person in the bathroom, thereby dispensing water from the sprayer over the various surfaces of the bathroom and possibly creating a hazardous condition on the floor of the bathroom.

It is therefore desirable to develop a sprayer assembly that can be attached to a water supply line for a toilet when in use, but that can also be detached quickly and easily from the water supply line and stored in a separate location apart from the toilet when not in use.

SUMMARY OF THE INVENTION

It is an object of the present invention to provide a sprayer assembly including a valve housing connectable to a water supply line for a toilet and a sprayer that can be releasably attached to the housing.

It is another object of the present invention to provide a sprayer assembly in which the valve housing is capable of supplying water to the toilet and to the sprayer simultaneously.

It is still another object of the present invention to provide a sprayer assembly incorporating a quick release attachment member that is releasably engageable with the valve housing.

It is still a further object of the present invention to provide a sprayer assembly that has a simple and easily to install and use construction.

The present invention is a sprayer assembly adapted for use with a conventional toilet having a water supply tank. The sprayer assembly includes a valve housing that can be secured to a water supply line for the toilet tank in order to utilize a part of the water supplied to the tank as the water to be dispensed from the sprayer. The valve housing is a three-way valve housing including a supply conduit secured at opposite ends to the tank water supply line and a diverting conduit attached to the supply conduit between the opposite ends. The housing also includes a plunger movably disposed within the diverting conduit that is capable of sliding movement with respect to the housing in order to selectively open and close the diverting conduit. The plunger includes a sealing member that can be selectively engaged with the diverting conduit, such that the plunger can selectively completely obstruct water flow to the diverting conduit when in an extended position, and can allow water flow through both the supply conduit and the diverting conduit when in the depressed position.

The plunger is depressed with respect to the valve housing and the diverting conduit by an attachment member that is releasably insertable into the diverting conduit. The attachment member is connected opposite the diverting conduit to a hose which, in turn, is connected to a spray head or sprayer at the opposite end. The spray head includes a dispensing mechanism that is manually operable to dispense water flowing through the valve housing and diverting conduit from the spray head as desired.

Various other objects and advantages of the present invention will be made apparent from the following detailed description taken together with the drawings.

BRIEF DESCRIPTION OF THE DRAWINGS

The drawings illustrate the best mode currently contemplated of practicing the present invention.

In the drawings.

DETAILED DESCRIPTION OF THE DRAWINGS

Figure 1:
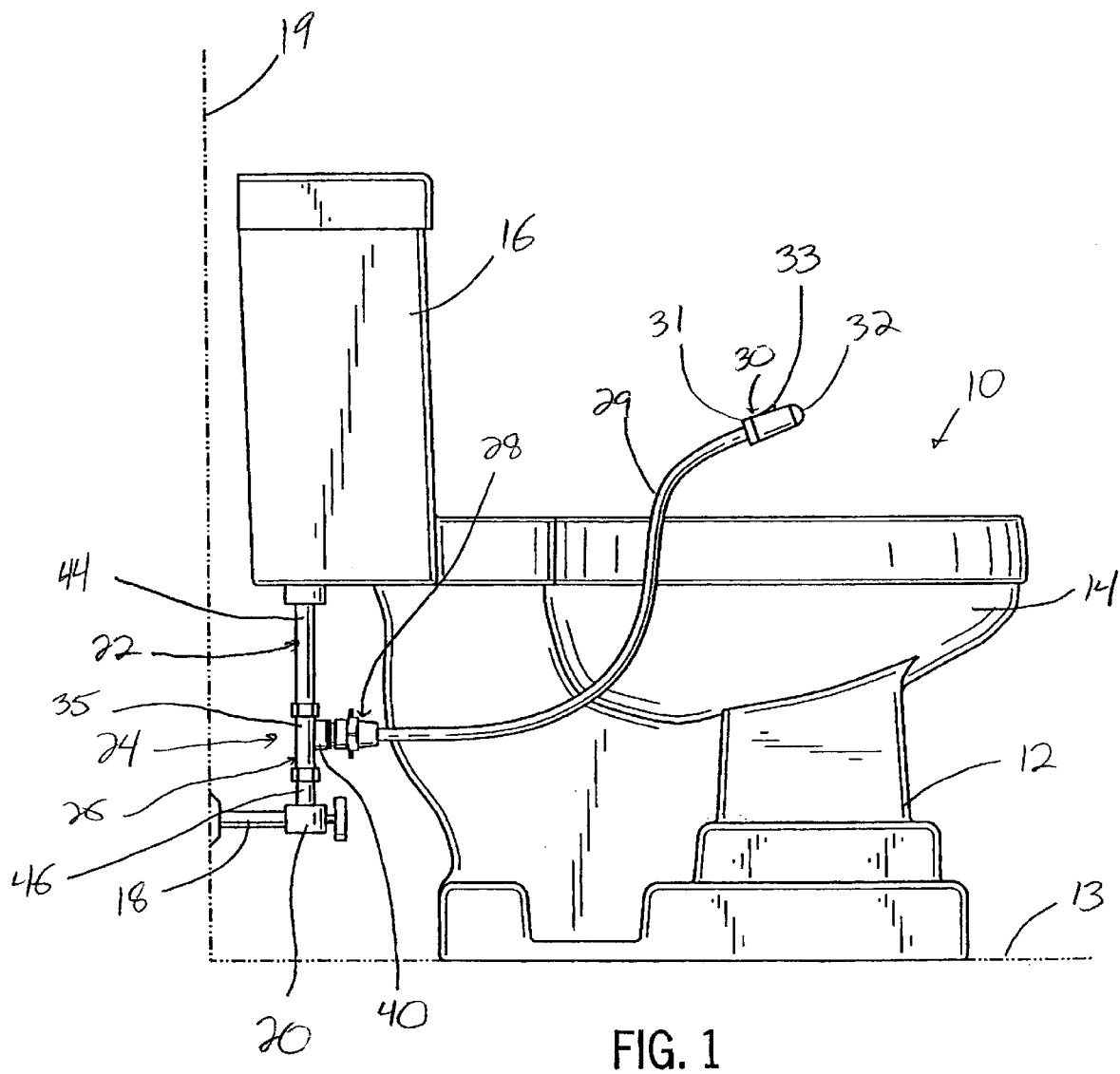
FIG. 1 is an isometric view of a conventional toilet to which the sprayer assembly of the present invention is attached.

With reference now to the drawing figures in which like reference numerals designate like parts throughout the disclosure, a conventional toilet indicated generally at 10 is shown in FIG. 1. The toilet 10 includes a base 12 disposed on a surface 13, such as a restroom floor, that supports a bowl 14 and a tank 16. The toilet 10 can be any conventional toilet design having a water tank 16. The tank 16 is operably connected to a water inlet 18 extending outwardly from a wall 19 or the floor surface 13 by a supply valve 20 that directs the water through a tank supply line 22 from the water inlet 18 to the tank 16.

A sprayer assembly 24 is operably connected to the supply line 22. The assembly 24 includes a valve housing 26 secured to the supply line 22 and an attachment member 28 that can be releasably secured to the housing 26. The attachment member 28 is fixedly secured to one end of a hose 29 that has a dispenser or sprayer 30 attached opposed the member 28.

The sprayer 30 includes an inlet end 31, an outlet end 32 having outlet openings (not shown) and a manual dispensing mechanism 33 that allows a fluid to flow through the sprayer 30 from the inlet end 31 to the outlet end 32 and out of the outlet openings when activated. As shown in FIG. 1, the dispensing mechanism 33 is a depressible trigger, but can also be any suitable type of mechanism. Further, the design of the sprayer 30 can be any suitable sprayer that includes a manual dispensing mechanism.

Figure 2:
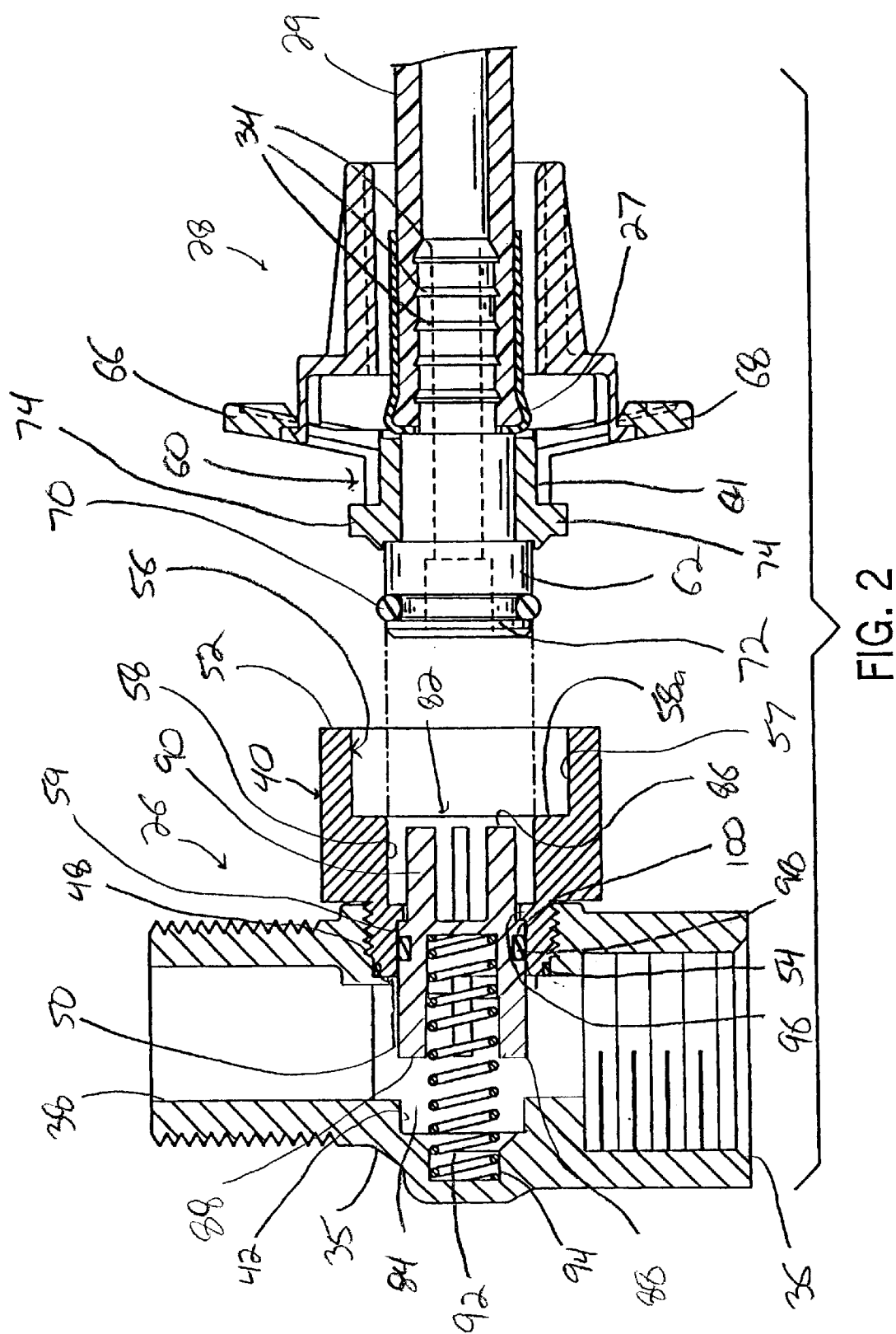
FIG. 2 is a cross-sectional view of the valve housing and attachment member of the sprayer assembly of FIG. 1 in the disengaged position.
Figure 3:
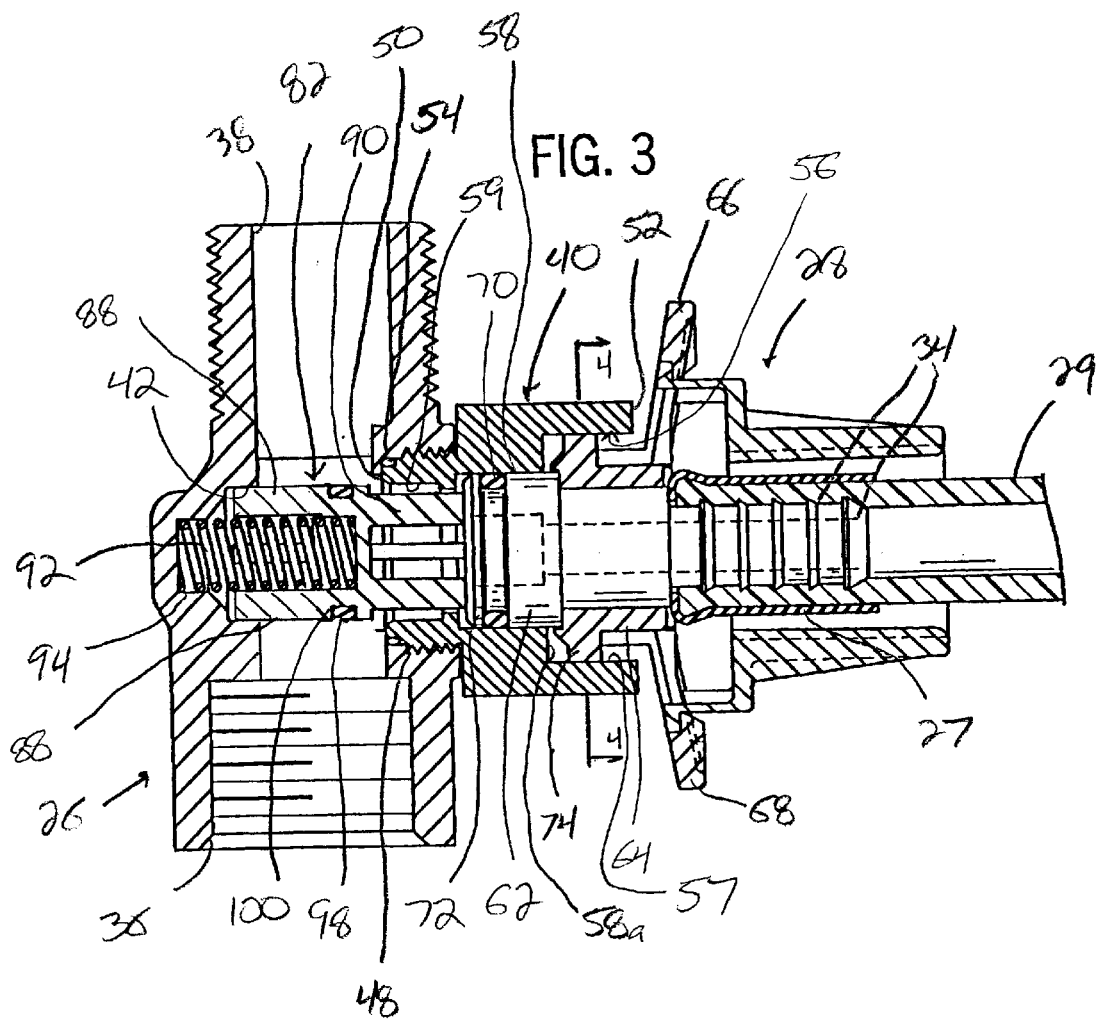
FIG. 3 is a cross-sectional view similar to FIG. 2 illustrating the valve housing and attachment member of FIG. 1 in the engaged position.
Figure 4:
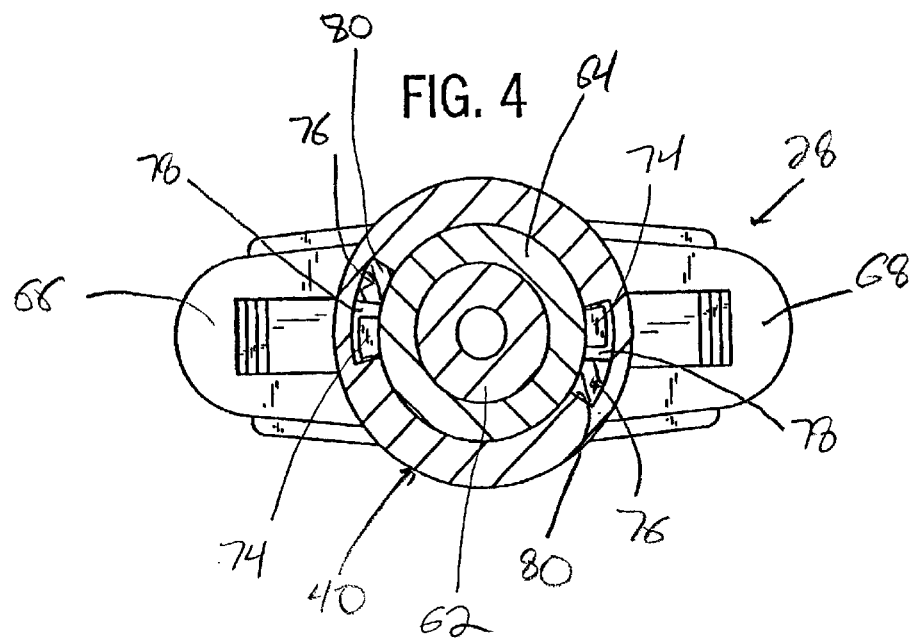
FIG. 4 is a cross-sectional view along line 4—4 of FIG. 3.

Referring now to FIGS. 2–4, the hose 29 is secured to the attachment member 28 by pushing the hose 29 over a number of circumferential ridges 34 on the member 28 and placing a retainer 27 around the hose 29 to compress the hose 29 into engagement with the ridges 34. Further, the hose 29 is formed of a flexible material, such as a soft plastic, and has a length sufficient to enable the sprayer 30 to be positioned as necessary with respect to the individual using the toilet 10.

The valve housing 26 and attachment member 28 are formed similarly to the valve structure disclosed in Mueller et al. U.S. Pat. Nos. 5,560,548 and 5,624,073, which are herein incorporated by reference in its entirety. The valve housing 26 includes a supply conduit 35 having a water inlet 36, and water outlet 38, a diverting conduit 40 engaged with the supply conduit 35. The supply conduit 35 also defines an annular cavity 42 that allows fluid communication between the water inlet 36, the water outlet 38 and the diverting conduit 40. The supply conduit 35 is formed of a rigid, waterproof material such as a hard plastic or a metal. The water inlet 36 and water outlet 38 are adapted to be engaged with an upper section 44 and lower section 46, respectively, of the supply line 22.

The diverting conduit 40 is formed of a material similar to the supply conduit 35 and is threadedly engaged with the supply conduit 35 in an opening 48 disposed between the water inlet 36 and water outlet 38. The diverting conduit 40 includes a first end 50 engageable within the opening 48, and a second end 52 opposite the first end 50. The first end 50 of the diverting conduit 40 engaged with the supply conduit 35 includes a sealing member 54, such as a rubber O-ring, that encircles the exterior of the first end 50 to provide a water-tight seal between the diverting conduit 40 and the supply conduit 35. The diverting conduit 40 also defines a throughbore 56 extending between the first end 50 and second end 52 that includes three separate diameter sections, i.e., an outer section 57, a middle section 58 and an inner section 59.

The second end 52 and outer section 57 are configured to receive the attachment member 28 which is formed with a coupling 60 located on the attachment member 28 adjacent the ridges 34 that are secured to the hose 29. Although the coupling 60 can take a variety of forms, in a preferred embodiment the coupling 60 includes a generally cylindrical adapter 62 insertable through the second end 52 and into the middle section 58, a generally cylindrical locking ring 64 engaged between the adapter 62 and the retainer 27, and including a pair of gripable flanges 66 and 68 extending from opposite sides of the locking ring 64, and a sealing member 70 disposed within a peripheral recess 72 in the adapter 62 opposite the locking ring 64. The adapter 62 and locking ring 64 may be formed of a material similar to the supply conduit 35, and may be formed separately or integrally with one another.

When the coupling 60 is inserted into the second end 52 of the diverting conduit 40, the sealing member 70 on the adapter 62 engages the interior of the middle section 58 to provide a watertight seal between the coupling 60 and the diverting conduit 40. Also, in this configuration the coupling 60 and hose 29 are positioned in fluid communication with the annular cavity 42 within the valve housing 26.

As best shown in FIGS. 2 and 3, the diameter of the adapter 62 is smaller than the diameter of the locking ring 64, such that the adapter 62 conforms generally to the diameter of the middle section 58, in which the adapter 62 is retained. Further, the diameter of the locking ring 64 corresponds to the diameter of the outer section 57 in which the locking ring 64 is retained by an annular shoulder 58a that separates the outer section 57 from the middle section 58 to properly position the coupling 60 within the diverting conduit 40.

The coupling 60 can be secured or locked in this position within the diverting conduit 40 by aligning a pair of locking tabs 74 disposed on opposite sides of the locking ring 64 with a pair of generally L-shaped recesses 76 disposed on opposite sides of the outer section 57 of the diverting conduit 40. The tabs 74 are inserted into each recess 76 along the axially extending portion 78 of each recess 76 until the tabs 74 contact the interior end of the recesses 76. In this position, the coupling 60 can then be rotated to move the tabs 74 along the circumferential portion 80 of each recess 76 which can engage and retain the tabs 74 within the recesses 76.

The valve housing 26 also includes a plunger 82 disposed within the annular cavity 42 and slidably movable with respect to the supply conduit 35 and diverting conduit 40. The plunger 82 has an inner end 84 located within the cavity 42, and an outer end 86 located within the inner section 59 of the diverting conduit 40. The inner end 84 includes a number of guide fingers 88 that operate to guide the movement of the plunger 82 within the cavity 42 without inhibiting fluid flow through the cavity 42. The outer end 86 is also provided with a number of guide fingers 90 shaped similarly to fingers 88 which guide the movement of the plunger 82 in the diverting conduit 40 and do not obstruct the flow of fluid from the cavity 42 through the diverting conduit 40.

A spring 92 has one end disposed within a recess 94 disposed in the cavity 42 opposite the diverting conduit 40, and a second end abutting the plunger 82 between the guide fingers 88. Thus, the spring 92 biases the plunger 82 outwardly from the cavity 42 and into the diverting conduit 40. The sliding movement of the plunger 82 into the diverting conduit 40 is limited by a radial flange 96 on the conduit 40 that extends inwardly into the conduit 40 between the inner portion 59 and the middle portion 58. The flange 96 contacts the plunger 82 around the guide fingers 90 and retains the plunger 82 partially within the cavity 42. In the fully extended position, a sealing member 98 disposed within a peripheral recess 100 on the plunger 82 sealingly engages the inner section 59 of the diverting conduit 40 to prevent fluid from flowing between the plunger 82 and the diverting conduit 40.

When the coupling 60 is inserted into the diverting conduit 40 as shown in FIG. 3, the adapter 62 contacts the guide fingers 90 and urges the plunger 82 into the cavity 42 against the bias of the spring 92. The sealing member 98 is thus urged out of sealing contact with the first end 50 of the conduit 40 such that fluid may flow from the cavity 42 into the diverting conduit 40 in order to supply the sprayer 30 with fluid. Further, as opposed to the valve design shown in Mueller et al. U.S. Pat. Nos. 5,560,548 and 5,624,073, the structure of the supply conduit 35 and cavity 42 prevents any sealing engagement of the sealing member 98 with the cavity 42 when the plunger 82 is in the depressed position shown in FIG. 3, such that fluid is also allowed to flow through the cavity 42 to the water outlet 38 when the plunger 82 is extended or retracted. In this manner, the individual can operate both the toilet 10 and the sprayer 30 simultaneously. The assembly 24 can be maintained in this configuration, as previously described, by the engagement of the locking tabs 74 within the circumferential portions 80 of the locking recesses 76 for as long as desired.

When it is desired to remove and store the attachment member 28, the hose 29 and sprayer 30 for aesthetic purposes, the coupling 60 is rotated with respect to the diverting conduit 40 such that the tabs 74 are disengaged from within the locking recesses 76. The coupling 60 is then removed from within the diverting conduit 40 allowing the plunger 82 to be biased outwardly by the spring 92 in order to seal the plunger 82 within the inner portion 59 of the diverting conduit 40 against the flange 96 and prevent fluid flow through the conduit 40. The attachment portion 28, hose 29 and sprayer 30 can then be placed in a separate storage location, and the toilet 10 can be utilized in a normal manner.

While the preferred embodiment of the assembly 24 is disclosed as being used in conjunction with a toilet 10, the scope of the present invention is not limited to this use. For example, the assembly 24 can be attached to water supply lines or conduits for showers, faucets and other water dispensing structures for use in the above-described manner. Also, the assembly 24 can include various additions to or substitutes for the sprayer 30, such as soap cartridges, nozzle attachments, and the like.

Various alternatives are contemplated as being within the scope of the following claims particularly pointing out and distinctly claiming the subject matter regarded as the invention.

We hereby claim:

1. A dispensing assembly releasably attachable to a water supply line, the assembly comprising:
   a dispenser including an outlet end, an inlet end and a dispensing mechanism;
   a hose connected to the inlet end of the dispenser;
   an attachment member secured to the hose opposite the dispenser; and
   a valve housing connectable to the water supply line, the housing including a supply conduit, a diverting conduit that is secured to the supply conduit and is releasably and sealingly engageable with the attachment member, a plunger disposed within the diverting conduit and moveable from a closed position to an open position, and a biasing member disposed between the plunger and the supply conduit to urge the plunger into a closed position, wherein water flows through the supply conduit when the plunger is in the closed position and simultaneously through the supply conduit and through the diverting conduit when the plunger is in the open position.

2. The dispensing assembly of claim 1 wherein the dispensing mechanism is manually activated.

3. The dispensing assembly of claim 2 wherein the dispensing mechanism is a manually depressible trigger.

4. The dispensing assembly of claim 1 wherein the attachment member includes at least one locking member releasably engageable with a recess located on the valve housing.

5. The dispensing assembly of claim 1 wherein the biasing member is a spring.

6. The dispensing assembly of claim 1 wherein the attachment member includes a first sealing member that sealingly engages the diverting conduit when the attachment member is secured to the diverting conduit.

7. The dispensing assembly of claim 1 wherein the plunger includes a number of guide members used to guide the plunger within the diverting conduit.

8. The dispensing assembly of claim 1 wherein the plunger includes a second sealing member that sealingly engages the diverting conduit when the attachment member is not secured to the diverting conduit.

9. The dispensing assembly of claim 1 wherein the dispenser is a sprayer.

10. A valve assembly adapted for use with a sprayer including an inlet end, an outlet end, a manual dispensing mechanism, and a hose connected at one end to the inlet end of the sprayer, the valve assembly comprising:
    a valve housing adapted to be connected to a water supply line, the valve housing including a supply conduit, a diverting conduit attached to and intersecting the supply conduit, and a spring-biased plunger disposed within the diverting conduit, and a biasing member disposed between the plunger and the supply conduit to urge the plunger into a closed position and moveable to an open position where water is capable of flowing through the supply conduit and the diverting conduit simultaneously; and
    an attachment member that is quickly and releasably engageable within the diverting conduit and adapted to be secured to the hose opposite the sprayer.

11. The valve assembly of claim 10 wherein the diverting conduit and the supply conduit are integrally formed.

12. The valve assembly of claim 10 wherein the diverting conduit and the supply conduit are separately formed.

13. The valve assembly of claim 12 wherein the diverting conduit is threadedly engaged with the supply conduit.

14. The valve assembly of claim 10 wherein the diverting conduit and the supply conduit are formed of a generally rigid, waterproof material.

15. The valve assembly of claim 10 wherein the attachment member is formed of a generally rigid, waterproof material.

16. A method for dispensing water from a sprayer connected to a water supply line without interrupting water flow through the supply line, the method comprising the steps of:
    a) attaching a valve housing to the water supply line, the valve housing including a supply conduit attached to the supply line and a selectively operable diverting conduit attached to the supply conduit, a spring-biased plunger disposed within the diverting conduit and moveable from a closed position to an open position, and a biasing member disposed between the plunger and the supply conduit to urge the plunger into a closed position, wherein water flows through the supply conduit when the plunger is in the closed position and simultaneously through the supply conduit and through the diverting conduit when the plunger is in the open position;
    b) quickly and releasably engaging an attachment member with the diverting conduit to open the diverting conduit without interrupting water flow through the supply conduit, the attachment member connected to one end of a hose connected at the opposite end to an inlet end of a sprayer including an outlet end opposite the inlet end and a dispensing mechanism; and
    c) actuating the dispensing mechanism to dispense water through the outlet end of the sprayer.

17. The method of claim 16 wherein the step of attaching the valve housing to the water supply line comprises the steps of:
   a) securing one end of the supply conduit to a lower portion of the water supply line; and
   b) securing the other end of the supply conduit to an upper portion of the water supply line.

18. The method of claim 16 wherein the step of engaging the attachment member to the diverting conduit comprises the steps of:
   a) inserting the attachment member into the diverting conduit; and
   b) releasably locking the attachment member in engagement with the diverting conduit.

19. The method of claim 18 wherein the step of inserting the attachment member into the diverting conduit comprises the steps of:
   pressing the attachment portion into the diverting conduit to depress the plunger out of the diverting conduit and into the supply conduit.

20. The method of claim 18 wherein the step of releasably locking the attachment portion in engagement with the diverting portion comprises the steps of:
   a) aligning at least one locking tab on the attachment portion with at least one locking slot on the diverting conduit; and
   b) rotating the attachment member within the diverting conduit to position the at least one locking tab within the at least one locking slot.

21. A bidet sprayer assembly comprising:

a valve housing releasably attachable to a water supply line for a toilet tank and capable of diverting water from the supply line without obstructing water flow to the tank, the housing including a supply conduit having a first end adapted to be secured to a lower section of the supply line, and a second end adapted to be secured to an upper section of the supply line, a diverting conduit secured to the supply conduit between the first and second ends, a plunger slidably disposed within the diverting conduit and a biasing means extending between the plunger and the supply conduit to bias the plunger into a closed position within the diverting conduit;

an attachment member that is quickly and releasably engageable within the diverting conduit to move the plunger to an open position;

a hose having one end connected to the attachment portion; and a sprayer including an inlet end, a manual fluid dispensing mechanism, and an outlet end, the inlet end connected to the other end of the hose.

* * * * *